April 24, 1928.
W. E. CELESTIN
SECTION TIRE FOR VEHICLES
Filed Aug. 24, 1926
1,667,535
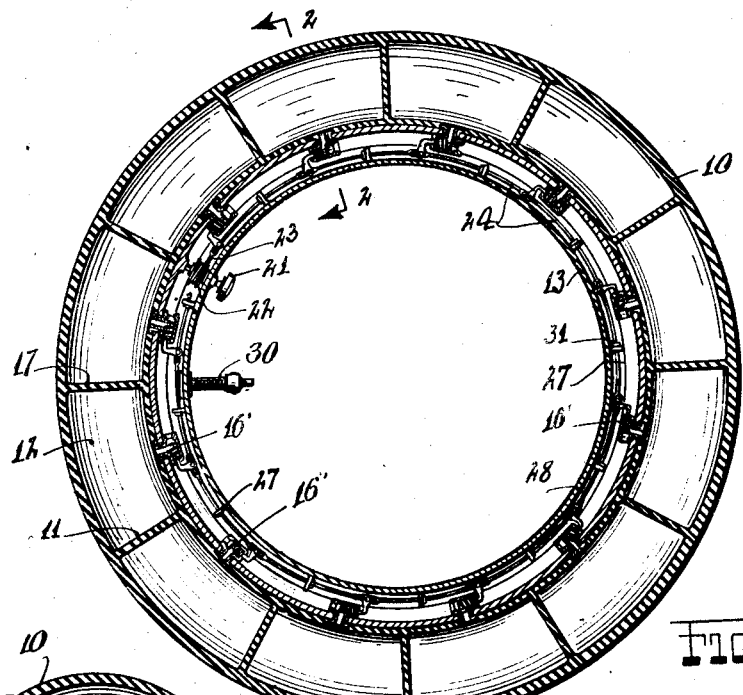
INVENTOR
William E. Celestin
BY
Zoltan R. Polachek
ATTORNEY Patented Apr. 24, 1928.

1,667,535

UNITED STATES PATENT OFFICE.

WILLIAM E. CELESTIN, OF NEW YORK, N. Y.

SECTION TIRE FOR VEHICLES.

Application filed August 24, 1926. Serial No. 131,140.

This invention relates generally to pneumatic tires such as used on motor vehicles and the like, the invention having more particular reference to a novel type of section tire. The invention has for an object the provision of an improved section tire which is not materially affected by punctures.

A further object of the invention is the provision of a section tire embodying air valves of simple and novel construction and arrangement of parts.

For further comprehension of the invention, and of the objects and advantages thereof, reference will be had to the following description and accompanying drawing, and to the appended claim in which the various novel features of the invention are more particularly set forth.

Fig. 1 of the drawing is a longitudinal central sectional view of my improved section tire.

Fig. 2 is an enlarged transverse sectional view taken on the line 2—2 of Fig. 1.

Fig. 3 is an enlarged fragmentary view, illustrating in particular the air valve as used in combination with my improved section tire.

Fig. 4 is a detail view of the air valve operating means.

Fig. 5 is a transverse sectional view taken on the line 5—5 of Fig. 4.

Fig. 6 is a fragmentary sectional view, illustrating another form of the tire member proper.

Fig. 7 is a further form of the tire member proper.

Fig. 8 is a transverse sectional view showing a further modification.

As here embodied my improved section tire comprises a tire member proper 10, preferably of rubber molded or otherwise attached to a fabric base, such as generally embodied in motor vehicle tires, commonly termed as the shoe. The tire member proper 10, is of cylindrical, tubular construction, and is provided with walls 11, integral therewith, or the walls may be constructed separately, as designated by the number 11', Fig. 6, vulcanized, as at 12', to the tire member proper 10, or otherwise attached thereto so as to form separate compartments 12. The tire member proper 10, may be constructed, as illustrated in Fig. 7, so as to provide overlapping separate compartments 12ª, in which event the walls are molded or formed, so as to have an intermediate portion 13' parallel to the longitudinal sides of the said tire member proper 10.

The tubular member 13, is preferably made in two sections, attached, as at 14, preferably by brazing, welding, or the like. The tubular member 13, is of continuous ring shaped construction, and is of suitable size to engage inside the tire member proper 10, so as to buckle or depress the said tire member proper 10, as at 15, as clearly shown in Fig. 2, of the accompanying drawing.

The air valve chambers 16', adapted to contain the air valves proper 16, are of hollow cylindrical construction, and are attached to the tubular member 13 and to the tire member proper 10. There being one of the latter described devices for each of the above mentioned compartments 12. The air valve proper 16 is provided with a conical shaped head 17, normally held in a similar shaped seat formed in the air valve chamber 16', by a compression spring 18, positioned on the stem of the said air valve proper 10, and superimposed between the collar 19, attached to the said stem, and the air chamber proper 16', so as to normally hold the said air valve proper in a closed position, as clearly shown in Fig. 3.

The rod 20 is rotatively mounted in the tubular member 13, and has attached at its extended extremity a knob 21, handle or the like. The spool 22, is attached to the rod 20, and is positioned inside the tubular member 13. The flexible member 23, a cord, wire, or the like, is attached, at one extremity, to the spool 22, and is wound thereon, a desired number of turns, and is attached, at its other extremity to the operating rod 24, a flexible wire or the like, which is provided with enlarged portions 25, having an elongated slot 26, cut or otherwise formed therein. The operating rod 24, is slidably mounted in extended elements 27 of the tubular member 13, and is of suitable length to extend around the entire length of the said tubular member 13.

The said stems of the air valves proper 16, have their extended elements 28, formed or bent at right angles thereto. The extended elements 28 are attached at their extremities, as at 29, by a pin or the like, to the operating rod 24. The said pins 29, engaging in the said elongated slots 26.

The above described construction being such as will permit the knob 21, when turned or rotated, in a clockwise direction, to open the said air valves proper 15, against the compression of the springs 18, so as permit air to be pumped into the above mentioned compartments, through the tire valve 30, of common construction, such as generally provided in pneumatic tires. This valve 30 is attached to the tubular member 13, as clearly shown in Fig. 1.

The collars 31 are attached to the operating rod 24, and are suitably positioned thereon, so as to engage with the said extended elements 27 of the tubular member 13, as a means of determining the correct position or location of the elongated slots 26 formed in the operating rod 24.

It being further understood that air may be pumped in the above mentioned compartments 12, without the manipulation of the said knob 21, as the pressure of the said air will force the air valves proper 16 open, the elongated slots 26 formed in the operating rod 24, allowing the said movement or opening of the said tire valves proper.

As shown in Fig. 8 the tube 10 is divided into two annular compartments 10′ and 10ᵃ by a partition 10ᵇ. Tube 10 is provided with a twin valve 20′ to supply air into the two compartments simultaneously. The valve 20′ is of ordinary construction except that it is provided with two nozzles 20ᵃ which project into the two compartments.

It is obvious from the foregoing description, that I have provided a section tire embodying separate compartments, which will enable the tire to be used although one or a number of the said compartments, may be punctured, or otherwise incapacitated.

Having thus described my invention, what I claim as new and desire to protect by Letters Patent of the United States is as follows:—

In a section tire of the class described a tire member proper provided with walls, so as to provide separate compartments, a tubular member adapted to engage inside the said tire member proper, so as to depress the said tire member proper, air valve chambers adapted to contain air valves proper, said air valve chambers attached to the said tubular member and to the said tire member proper, said tire valves proper normally held in a closed position by a spring, a manually operable means of opening the said tire valves proper comprising, a rod rotatively mounted in the said tubular member, a knob attached to the extended extremity of the said rod, a spool attached to the said rod, a flexible member attached to and wound in the said spool, said flexible member attached to an operating rod slidably mounted in the said tubular member, said operating rod attached to the said tire valves proper, so as to allow the said valves to open without the movement of the said operating rod.

In testimony whereof I have affixed my signature.

WILLIAM E. CELESTIN.